(12) United States Patent
So

(10) Patent No.: US 6,915,735 B1
(45) Date of Patent: Jul. 12, 2005

(54) EGG YOLK SEPARATOR

(76) Inventor: Kwok Kuen So, 2nd Floor, Chuan Yuan Factory Building, 342-344 Kwun Tong Road, Kwun Tong, Kowloon (HK)

( * ) Notice: Subject to any disclaimer, the term of this patent is extended or adjusted under 35 U.S.C. 154(b) by 0 days.

(21) Appl. No.: 10/777,139

(22) Filed: Feb. 13, 2004

(51) Int. Cl.[7] ............................................. A47J 43/14
(52) U.S. Cl. ........................................ 99/499; 99/497
(58) Field of Search .................. 99/495, 496–500, 99/567, 568, 537; 30/120.1, 325, 327; 294/7–9, 294/12, 55, 55.5; D7/667

(56) References Cited

U.S. PATENT DOCUMENTS

| | | | |
|---|---|---|---|
| 1,463,394 A | * | 7/1923 | Heisner et al. ............... 248/94 |
| 1,868,336 A | * | 7/1932 | Clinton .................... 210/532.1 |
| 2,035,065 A | * | 3/1936 | Gray ............................. 99/499 |
| 2,212,502 A | * | 8/1940 | Leahey ......................... 99/499 |
| 2,430,156 A | * | 11/1947 | Byers .......................... 99/499 |
| 2,476,356 A | * | 7/1949 | Cook ........................... 99/498 |
| 2,523,777 A | * | 9/1950 | Polcar .......................... 99/499 |
| 2,720,232 A | * | 10/1955 | Denton ........................ 99/499 |
| 3,656,525 A | * | 4/1972 | Goodart ....................... 99/499 |
| 3,749,001 A | * | 7/1973 | Swett .......................... 99/499 |
| 3,857,327 A | * | 12/1974 | Popeil .......................... 99/499 |
| 4,542,584 A | * | 9/1985 | Talbot ....................... 30/120.1 |
| 5,088,392 A | * | 2/1992 | Ancona et al. ............... 99/499 |
| 5,784,953 A | * | 7/1998 | Wang ........................... 99/499 |
| 6,135,017 A | * | 10/2000 | Wang et al. .................. 99/499 |

* cited by examiner

Primary Examiner—Timothy F. Simone
(74) Attorney, Agent, or Firm—Leydig, Voit & Mayer, Ltd.

(57) ABSTRACT

An egg yolk separator includes a strainer having a portion for retaining an egg yolk and apertures for straining egg white. A pair of arms extends in opposite directions from the strainer for resting on opposite sides of an opening of a vessel, locating the separator on the vessel. One of the arms is extendable and retractable in length such that overall length of the separator is adjustable to suit the width of the opening of the vessel.

8 Claims, 2 Drawing Sheets

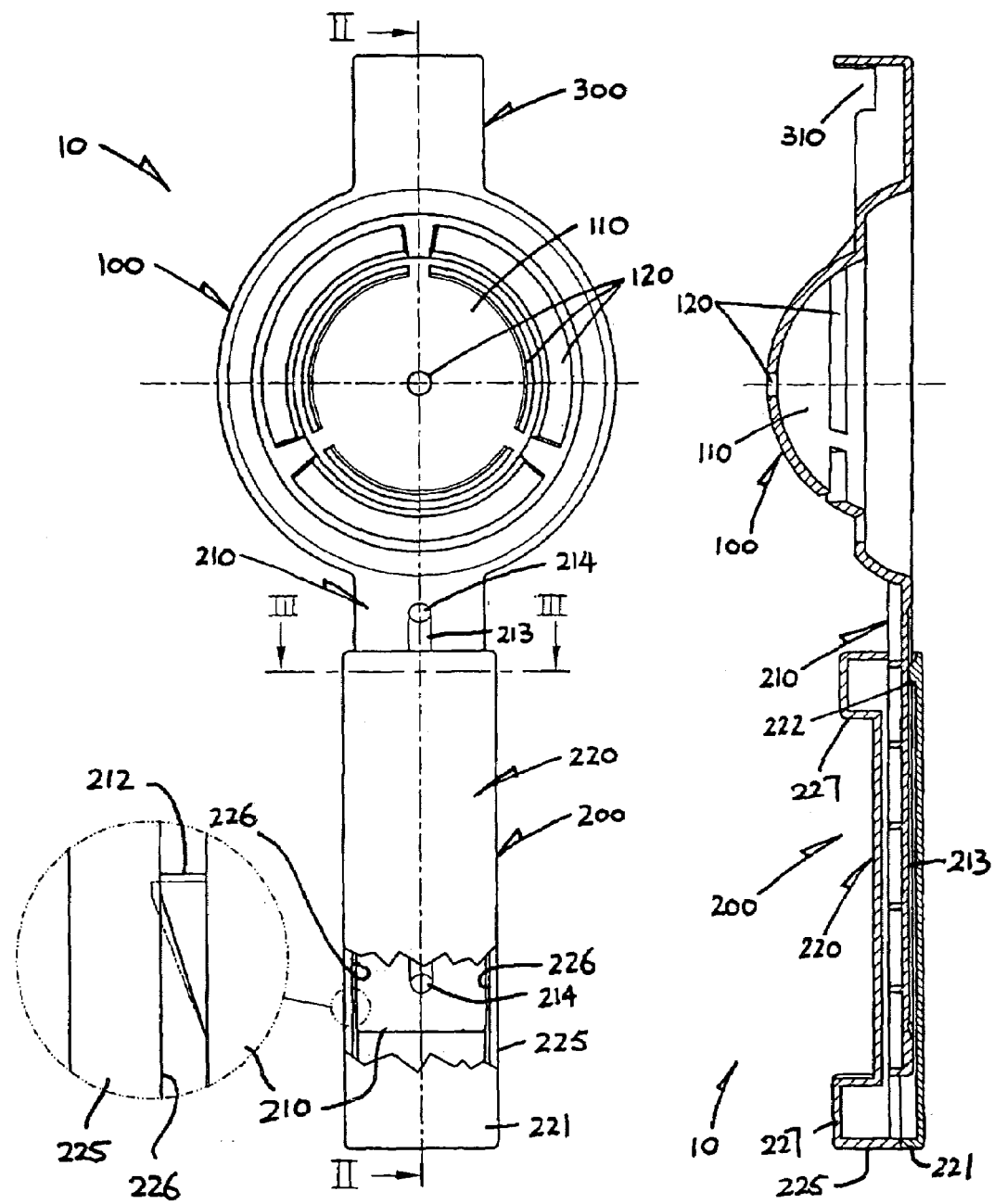
FIG. 1
FIG. 2
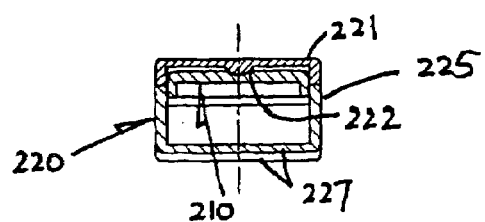
FIG. 3

EGG YOLK SEPARATOR

The present invention relates to an egg yolk separator.

BACKGROUND OF THE INVENTION

Egg yolk separators are generally known, and typically have a portion for retaining an egg yolk and apertures for straining egg white therefrom. They are usually available in the form of a handheld implement, like a ladle, or provided with a base for collecting egg white.

The invention seeks to provide an improved egg yolk separator that is more convenient to use.

SUMMARY OF THE INVENTION

According to the invention, there is provided an egg yolk separator including a strainer having a portion for retaining an egg yolk and apertures for straining egg white therefrom. A pair of supports extends in opposite directions from the strainer for resting on opposite sides of a top opening of a vessel to locate the overall separator thereon. A first of the supports is extendable and retractable in length such that the length of the overall separator is adjustable to suit the width of said vessel opening.

Preferably, the first support has a first section connected to the strainer and a second section slidably engaged lengthwise with the first section.

More preferably, the second section comprises a sleeve surrounding the first section such that the two sections inter-engage in a telescopic manner.

It is an advantage that the first support includes frictional engaging means provided between the first and the second sections for holding them at a desired length.

In a first preferred embodiment, the frictional engaging means comprise at least one resiliently deformable protrusion and a co-operating track provided at the two sections respectively, against which track the protrusion slidably bears upon resilient deformation.

More preferably, the second section comprises a sleeve surrounding the first section such that the two sections are inter-engaged in a telescopic manner, the first section including the protrusion and the second section including the track.

Further more preferably, the first section includes two said protrusions on opposite outer sides thereof bearing resiliently against respective said tracks internally of the second section.

In a second preferred embodiment, the frictional engaging means comprise a resiliently supported protrusion and a co-operating groove provided at the two sections respectively, against interior of which groove the protrusion slidably and resiliently bears.

More preferably, the second section comprises a sleeve surrounding the first section such that the two sections are inter-engaged in a telescopic manner, the first section including the groove and the second section including the protrusion.

Further more preferably, the groove has two relatively deeper parts at opposite ends thereof, with either one of which the protrusion is inter-engageable.

BRIEF DESCRIPTION OF DRAWINGS

The invention will now be more particularly described, by way of example only, with reference to the accompanying drawings, in which:

FIG. 1 is a top plan view of an embodiment of an egg yolk separator in accordance with the invention;

FIG. 2 is a cross-sectional side view of the egg yolk separator of FIG. 1, taken along line II—II;

FIG. 3 is a cross-sectional end view of the egg yolk separator of FIG. 1, taken along line III—III.

DETAILED DESCRIPTION OF PREFERRED EMBODIMENT

Figure 4:
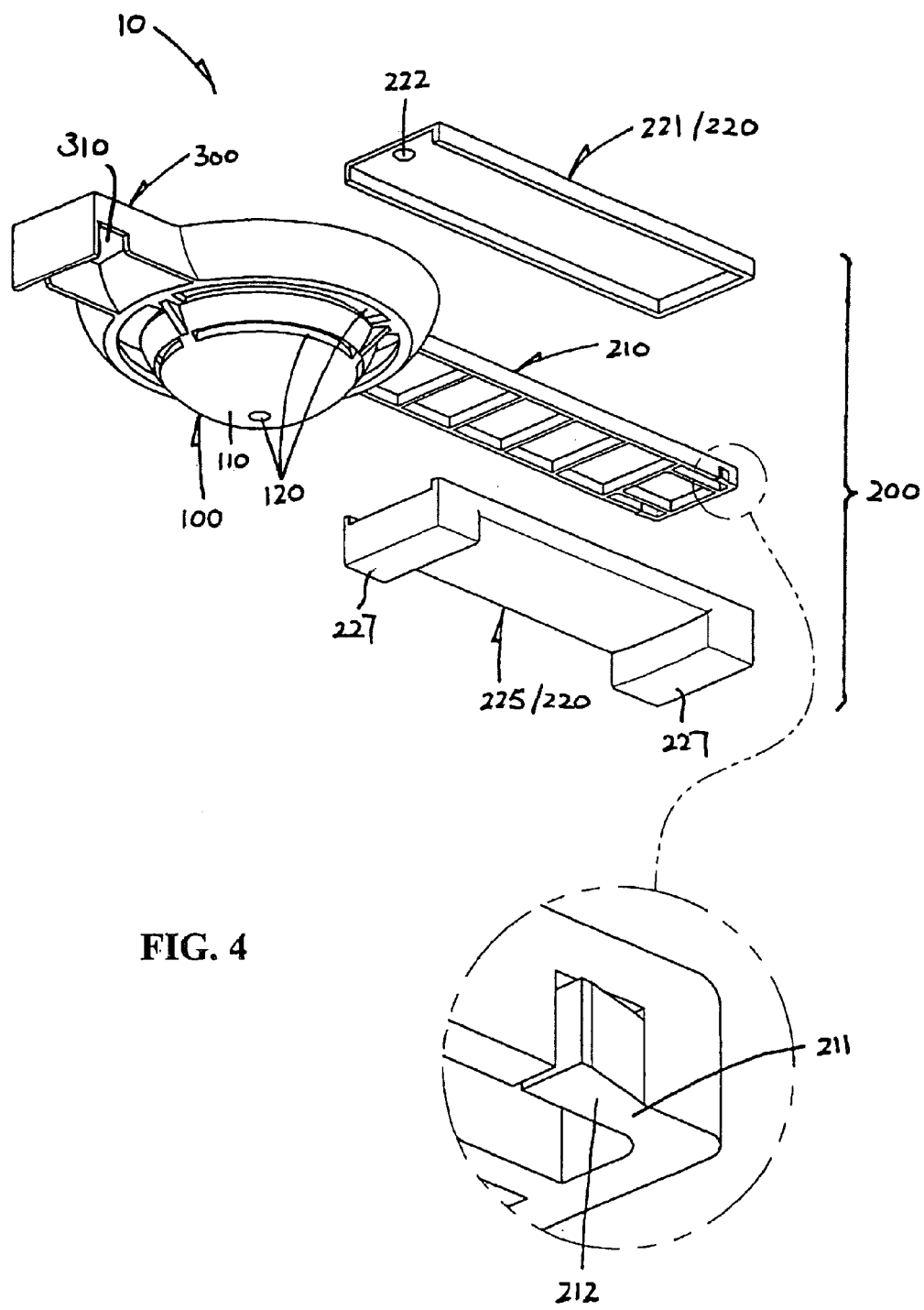
FIG. 4 is an exposed perspective view of the egg yolk separator of FIG. 1.

Referring to the drawings, there is shown an egg yolk separator 10 embodying the invention, which comprises a strainer 100 and two support arms 200 and 300 extending in diametrically opposite directions integrally from the strainer 100 for resting on opposite sides of a top opening of a vessel, such as a mixing bowl, to locate the separator 10 thereon. The strainer 100 has a central portion 110 for retaining an egg yolk and various apertures 120 for straining egg white therefrom. The first arm 200 is extendable and retractable in length such that the length of the overall separator 10 is adjustable to suit the width of the bowl opening. All these components are moulded from plastics material.

The first arm 200 has a first section 210 fixedly connected to the strainer 100 and a second section 220 slidably engaged lengthwise with the first section 210. The stationary section 210 is a straight flat strip 210. The slidable section 220 is a straight sleeve 220 surrounding the stationary section 210 such that the two sections 210 and 220 inter-engage in a telescopic manner, with the slidable section 220 being extendable and retractable lengthwise relative to the stationary section 210. The second arm 300 is considerably shorter than the first arm 200, including a downwardly facing hook 310 for locating upon one side of the bowl opening.

The slidable section 220 of the first arm 200 is formed by upper and lower shells 221 and 225 that are secured together by ultrasonic welding or glue for example. The two shells 221 and 225 define a flat rectangular-sectioned channel that encloses and receives the stationary section 210 as a slide fit. The stationary section 210 has, at its free end, a pair of small protrusions 212 on opposite left and right sides thereof. Opposite left and right inner surfaces of the lower shell 225 provide a pair of slightly recessed tracks 226 co-extending lengthwise of the shell 225, which accommodate the protrusions 212 and against which the protrusions 212 slidably bear.

Each protrusion 212 has an end 211 integrally connected to the stationary section 210, which is resiliently deformable such that the protrusion 212 is pressed inwards upon engaging the corresponding track 226. The engagement between the protrusions 212 and the co-operating tracks 226 on opposite sides provides proactive friction that holds the stationary and slidable sections 210 and 220 at a desired length of the first arm 200. The fully extended and retracted positions of the slidable section 220 relative to the stationary section 210 are defined by protrusions 212 reaching opposite ends of the corresponding tracks 226.

The first arm stationary section 210 includes, centrally and longitudinally in its upper surface, a shallow groove 213 that is relatively deeper at opposite ends to define two dips 214. The slidable section 220 includes, depending centrally from the innermost end of its upper shell 221, a round bump 222 that engages the groove 213. The bump 222 bears resiliently against the inner surface of the groove 213 as the part of upper shell 221 supporting the bump 222 is marginally deformed as a result of the engagement. This provides additional frictional holding of the slidable section 220 in position relative to the stationary section 210, whereby the length of the first arm 200 is better maintained.

At either the fully extended or retracted position of the slidable section 220, the bump 222 inter-engages or snaps with the dip 214 at the relevant end of the groove 213. Although the resulting engagement of the bump 222 with the dip 214 is relatively weak, it helps to maintain either end position of the slidable section 220, especially the fully retracted position when the separator 10 is not in use.

The lower shell 225 of the arm section 220 is thickened downwardly at opposite ends 227 to form a broad recess therebetween for engaging the opposite side of the bowl opening, with the hook 310 of the other arm 300 locating upon one side thereof. By including the recess, the arm section 220 may act as a handle so that the separator 10 can conveniently be held by hand for use.

Two different forms of frictional engagement are provided between the protrusions 212 and the tracks 226 and between the bump 222 and the groove 213, which preferably but not necessarily co-exist. In the case where the bowl is small, the adjustable arm 200 should be retracted to keep balance of the separator 10 on the bowl.

The invention has been given by way of example only, and various other modifications of and/or alterations to the described embodiment may be made by persons skilled in the art without departing from the scope of the invention as specified in the appended claims.

What is claimed is:

1. An egg yolk separator comprising:
    a strainer having a portion for retaining an egg yolk and apertures for straining egg white therefrom; and
    a pair of supports extending in opposite directions from the strainer for resting on opposite sides of an opening of a vessel, for locating the separator on the vessel, a first support of the pair of supports being extendable and retractable in length such that overall length of the separator is adjustable to suit the opening of the vessel, wherein
        the first support has a first section connected to the strainer and a second section slidably engaged, lengthwise, with the first section, and
        the second section comprises a sleeve surrounding the first section such that the first and second sections telescope.

2. The egg yolk separator as claimed in claim 1, wherein the first support includes frictional engaging means located between the first and the second sections for holding the first and second sections at a selected length.

3. An egg yolk separator comprising:
    a strainer having a portion for retaining an egg yolk and apertures for straining egg white therefrom; and
    a pair of supports extending in opposite directions from the strainer for resting on opposite sides of an opening of a vessel, for locating the separator on the vessel, a first support of the pair of supports being extendable and retractable in length such that overall length of the separator is adjustable to suit the opening of the vessel, wherein
        the first support has a first section connected to the strainer and a second section slidably engaged, lengthwise, with the first section, and
        the frictional engaging means comprises at least one resiliently deformable protrusion and a co-operating track located at the first and second sections, the protrusion slidably bearing upon the track by resilient deformation.

4. The egg yolk separator as claimed in claim 3, wherein the second section comprises a sleeve surrounding the first section such that the first and second sections telescope, the first section including the protrusion and the second section including the track.

5. The egg yolk separator as claimed in claim 4, wherein the first section includes two protrusions on opposite outer sides of the first section, bearing resiliently against respective tracks located internally in the second section.

6. An egg yolk separator comprising:
    a strainer having a portion for retaining an egg yolk and apertures for straining egg white therefrom; and
    a pair of supports extending in opposite directions from the strainer for resting on opposite sides of an opening of a vessel, for locating the separator on the vessel, a first support of the pair of supports being extendable and retractable in length such that overall length of the separator is adjustable to suit the opening of the vessel, wherein
        the first support has a first section connected to the strainer and a second section slidably engaged, lengthwise, with the first section, and
        the frictional engaging means comprises a resiliently supported protrusion and a co-operating groove located at the first and second sections, the protrusion slidably and resiliently bearing on a wall of the groove.

7. The egg yolk separator as claimed in claim 6, wherein the second section comprises a sleeve surrounding the first section such that the first and second sections telescope, the first section including the groove and the second section including the protrusion.

8. The egg yolk separator as claimed in claim 7, wherein the groove has two relatively deeper parts at opposite ends, the protrusion being engageable with each of the deeper parts.

* * * * *